US012057659B2

(12) United States Patent
Chen et al.

(10) Patent No.: US 12,057,659 B2
(45) Date of Patent: Aug. 6, 2024

(54) ELECTRONIC PORT HAVING A LOCKING ASSEMBLY FOR SECURING AN ELECTRONIC PLUG

(71) Applicant: Hewlett Packard Enterprise Development LP, Houston, TX (US)

(72) Inventors: Yuying Chen, Beijing (CN); Tri Luong Nguyen, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 558 days.

(21) Appl. No.: 17/444,039

(22) Filed: Jul. 29, 2021

(65) Prior Publication Data

US 2023/0034099 A1    Feb. 2, 2023

(51) Int. Cl.
*H01R 13/639*    (2006.01)
*H01R 13/426*    (2006.01)
*H01R 13/436*    (2006.01)
*H01R 13/422*    (2006.01)

(52) U.S. Cl.
CPC ......... *H01R 13/639* (2013.01); *H01R 13/426* (2013.01); *H01R 13/4362* (2013.01); *H01R 13/4223* (2013.01)

(58) Field of Classification Search
CPC .............. H01R 13/4223; H01R 13/426; H01R 13/4362; H01R 13/6273; H01R 13/639; G06F 2200/1639
See application file for complete search history.

(56) References Cited

U.S. PATENT DOCUMENTS

| 7,862,368 B1 * | 1/2011 | Lai ..................... H01R 13/6275 439/358 |
| 8,714,995 B2 * | 5/2014 | Chang ................. H01R 13/639 439/345 |
| 9,184,536 B2 * | 11/2015 | Senatori ................ H01R 13/62 |
| 9,362,673 B1 * | 6/2016 | Rinker ............... H01R 13/6275 |
| 10,374,361 B1 * | 8/2019 | Lien ....................... H01R 24/68 |

(Continued)

FOREIGN PATENT DOCUMENTS

| CN | 103606783 A | * | 2/2014 | |
| DE | 102016108780 A1 | * | 11/2017 | ......... H01R 13/6273 |
| DE | 202017107275 U1 | * | 6/2018 | |

*Primary Examiner* — Marcus E Harcum
(74) *Attorney, Agent, or Firm* — Hewlett Packard Enterprise Patent Department

(57) ABSTRACT

Example implementations relate to an electronic port of an electronic device, having a locking assembly to secure an electronic plug within the electronic device. The electronic port includes a receptacle, and the locking assembly including a rocker switch, a bracket, and an elastic arm. The receptacle is releasably connectable to a connector of the electronic plug. The rocker switch is pivotably connected to an enclosure of the electronic device. The bracket extends from the rocker switch, and disposed around a first end portion of the receptacle. The elastic arm includes a locking tab engaged with the bracket, and a seating tab seated on a second end portion of the receptacle. Where, in relaxed state of the elastic arm, lock features of the locking tab protrudes into the receptacle, and where the elastic arm is deformable from relaxed state to biased state to pull the lock features out of the receptacle.

20 Claims, 9 Drawing Sheets

(56) References Cited

U.S. PATENT DOCUMENTS

| | | | | |
|---|---|---|---|---|
| 2010/0317215 A1* | 12/2010 | Chang | ............. | H01R 13/70 |
| | | | | 439/304 |
| 2013/0217252 A1* | 8/2013 | Carden | ............. | H01R 13/639 |
| | | | | 439/304 |
| 2015/0346436 A1* | 12/2015 | Pepe | ............. | H01R 24/64 |
| | | | | 385/76 |
| 2021/0408727 A1* | 12/2021 | Fan | ............. | H01R 13/6275 |
| 2023/0335935 A1* | 10/2023 | Johnson | ............. | H01R 13/641 |

\* cited by examiner

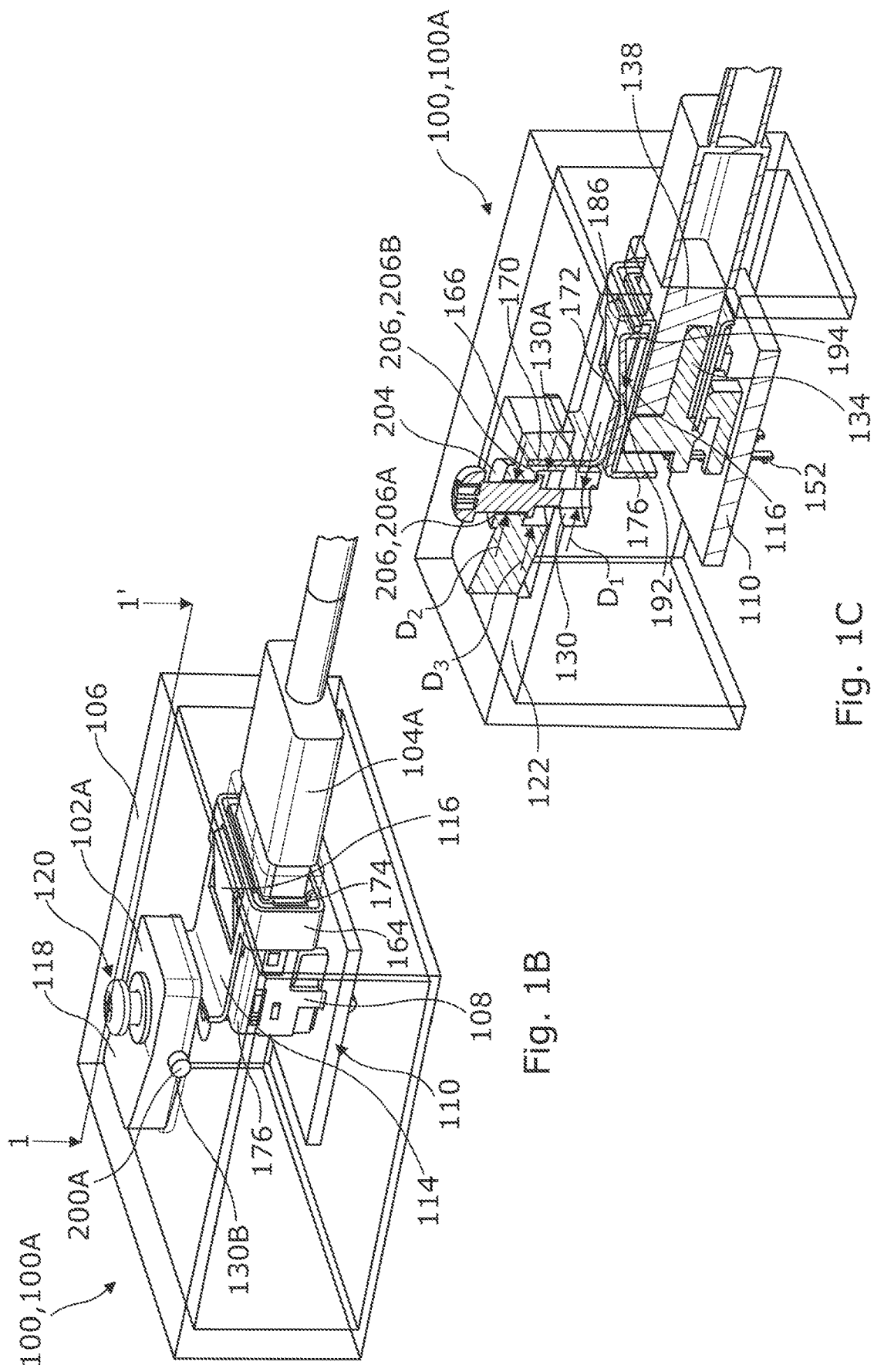

ELECTRONIC PORT HAVING A LOCKING ASSEMBLY FOR SECURING AN ELECTRONIC PLUG

BACKGROUND

Electronic devices, such as servers, storages, access points, or the like may include electronic Input-Output (IO) ports, such as universal serial bus (USB) ports. In such examples, electronic plugs, such as USB plugs may be connected to the electronic device via the USB ports for storing, processing, receiving, or transferring data. Since the USB plugs are removable from the USB ports of the electronic device in a "plug and play" manner, the USB ports may have a standardized connection interface for the USB plugs.

BRIEF DESCRIPTION OF THE DRAWINGS

Various examples will be described below with reference to the following figures.

FIG. 1B illustrates an assembled view of the electronic device of FIG. 1A according to an example implementation of the present disclosure.

FIG. 1C illustrates a cross-sectional view of the electronic device taken along a line 1-1' in FIG. 1B according to an example implementation of the present disclosure.

DETAILED DESCRIPTION

Figure 1A:
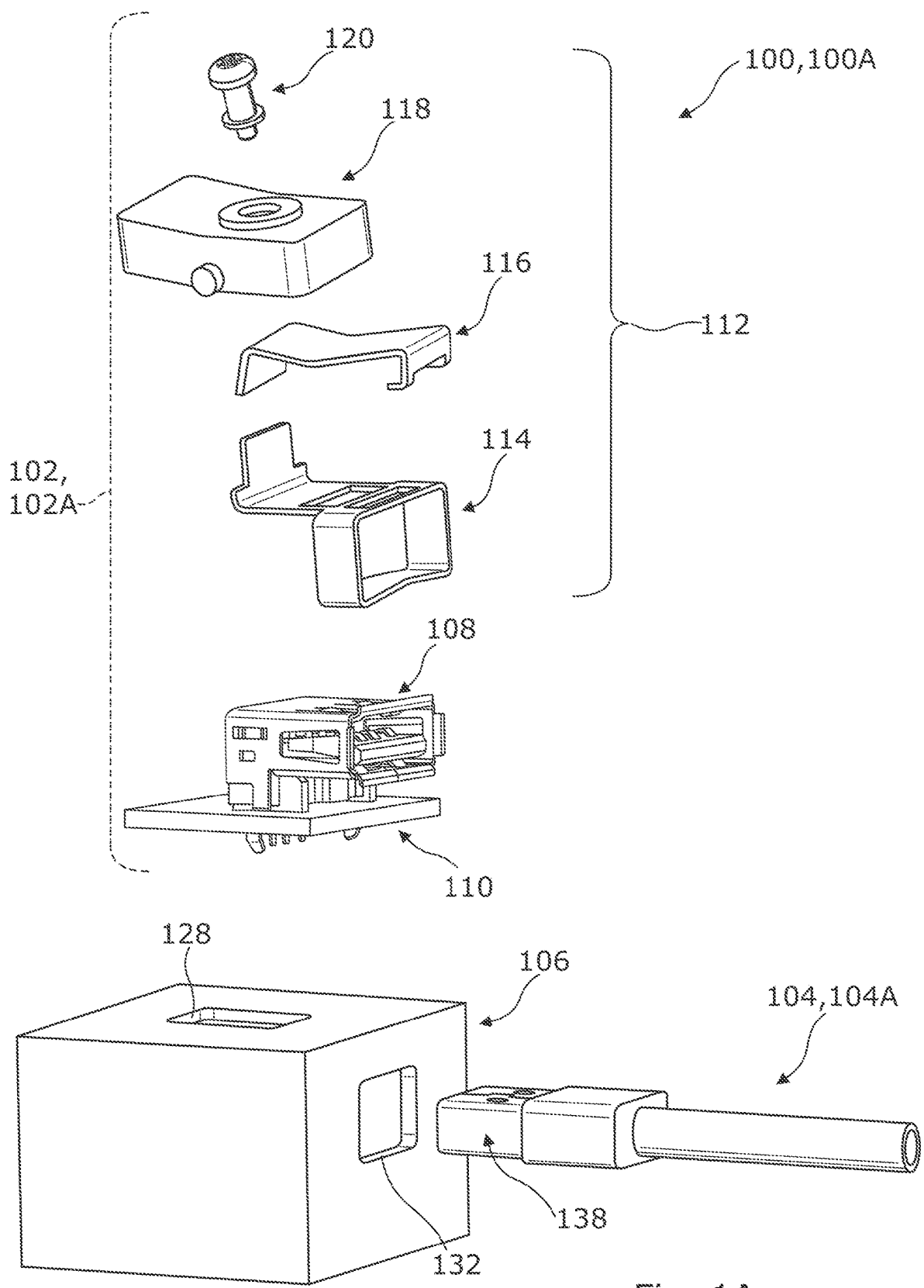
FIG. 1A illustrates an exploded view of an electronic device having an electronic port and an electronic plug according to an example implementation of the present disclosure.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing example embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements may be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

As used herein, the term "electronic device" may refer to a compute infrastructure, such as an access point, a server device, a storage device, a power conversion device, a communication device, or a networking device, having an electronic port for receiving an electronic plug. As used herein the term "access point" may refer to a type of the electronic device, which creates a wireless local area network (WLAN) by i) connecting to a router, a switch, or a hub via an Ethernet cable, and ii) projecting a Wi-Fi signal to a designated area via the electronic plug. As used herein, the term "electronic port" may refer to a port having a receptacle (or a socket), which is native to the electronic device, or which is integral to the electronic device, and may provision a connector of the electronic plug to be releasably connected to the electronic port. As used herein, the term "electronic plug" may refer to a plug having the connector, which is not native to the electronic device, or which is ancillary to the electronic device, and may have to be connected by way of fitting or plugging into the receptacle of the electronic port for storing, transmitting, receiving, or processing of data or the like. As used herein, the term "elastic arm" may refer to a flexible element, which may bent from an original position to a deformed position on application of a force, and restored to the original position from the deformed position upon release of the applied force. For example, the elastic arm may be a spring finger, or the like. As used herein, the term "lock feature" may refer to a lock structure, which may engage with a counter lock feature to lock (or restrict) a movement of a component having the counter lock feature. As used herein the term "counter lock feature" may refer to another lock structure, which may be complementary to that of the lock structure. As used herein, the term "upward movement" or "downward movement" may refer to a movement of a bracket along a direction, which may be perpendicular to a direction of a movement of the electronic plug, when releasably connected to the electronic port.

Figure 4:
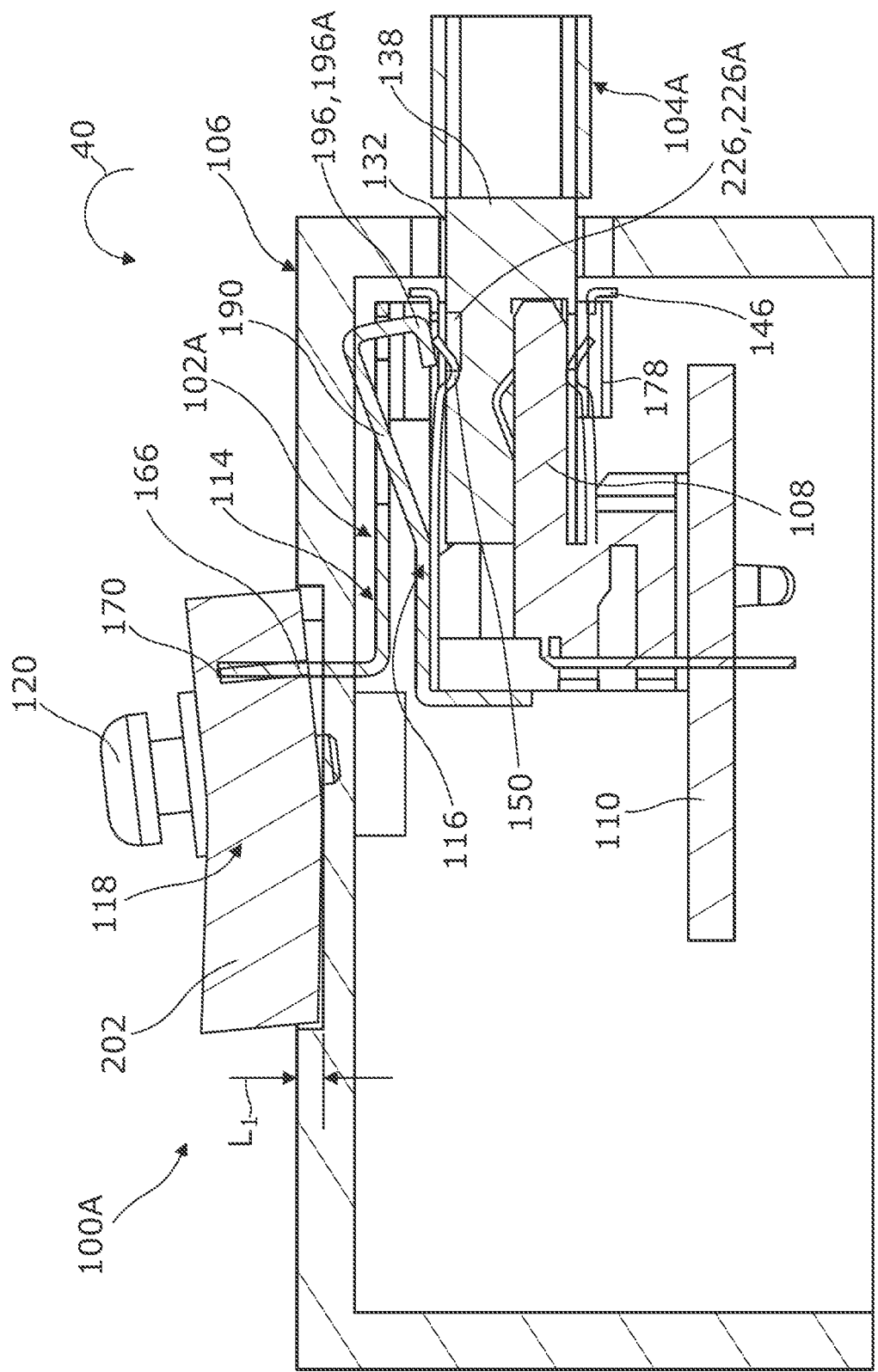
FIG. 4 illustrates a cross-sectional view of the electronic device having the electronic plug connected to the electronic port, and retained in an unlocked stage within the electronic port according to an example implementation of the present disclosure.
Figure 5:
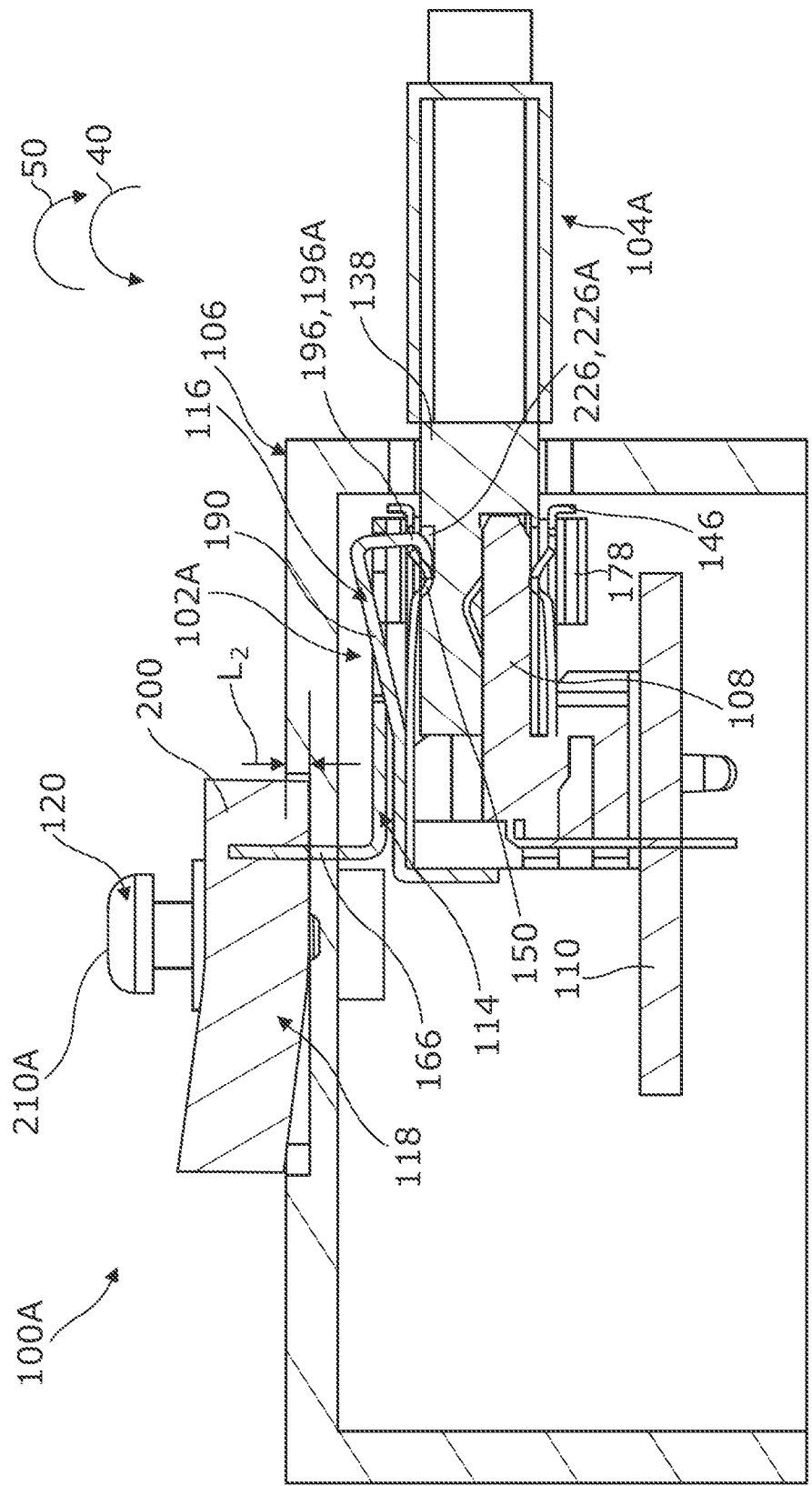
FIG. 5 illustrates a cross-sectional view of the electronic device having the electronic plug connected to the electronic port, and retained in a locked stage within the electronic port according to an example implementation of the present disclosure.
Figure 6:
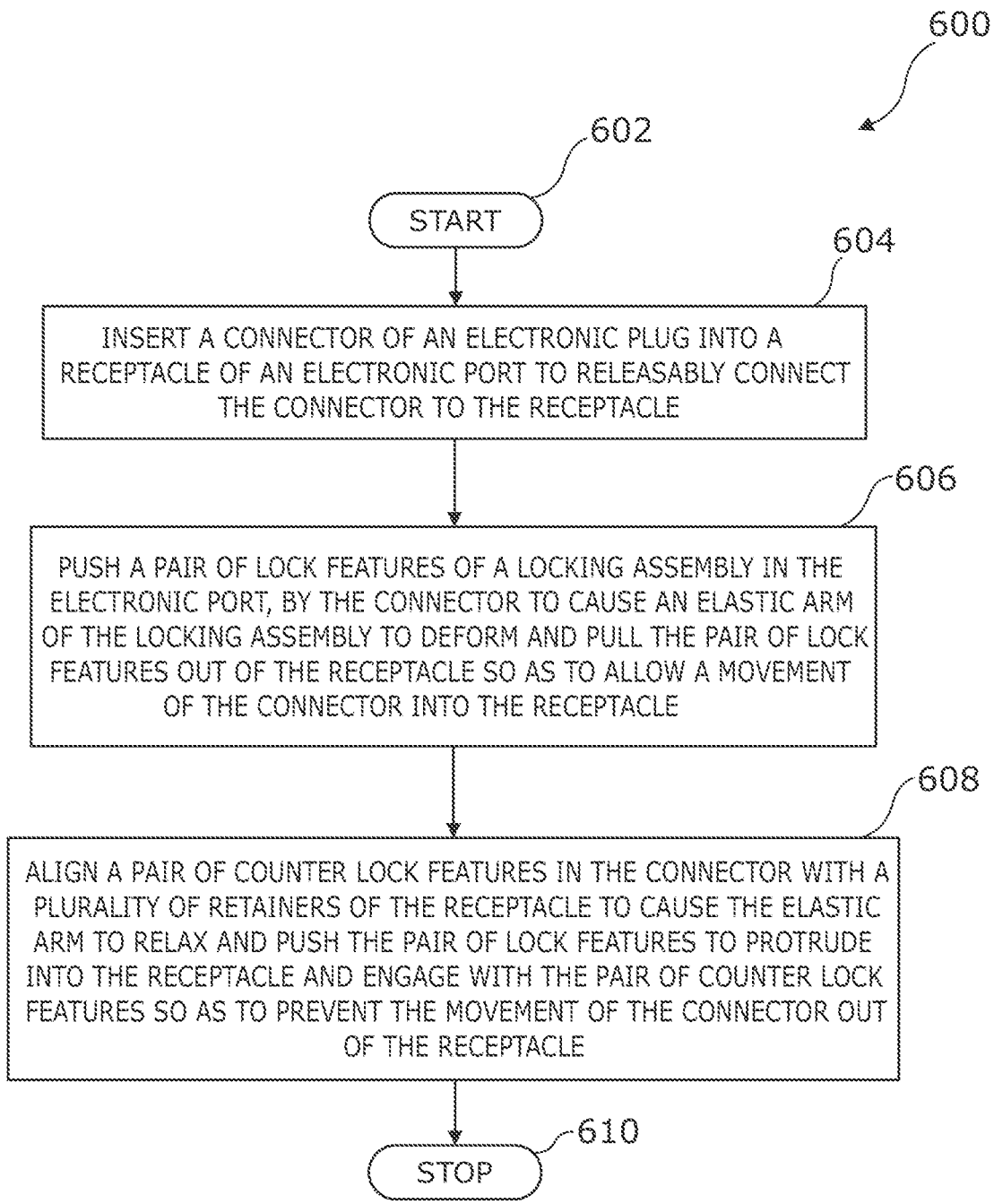
FIG. 6 is a flow diagram depicting a method of locking an electronic plug within an electronic port of an electronic device according to an example implementation of the present disclosure.

For purposes of explanation, certain examples are described with reference to the components or elements illustrated in FIGS. 1-6. The functionality of the illustrated components or elements may overlap, however, and may be present in a fewer or greater number of elements or components. Further, all or part of the functionality of illustrated elements may co-exist or be distributed among several geographically dispersed locations. Moreover, the disclosed examples may be implemented in various environments and are not limited to the illustrated examples. Further, the sequence of operations performed for locking (securing) the electronic plug within the electronic port described in connection with FIGS. 4-6, are an example and is not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. Such modifications and variations are intended to be included within the scope of this disclosure and protected by the following claims.

An electronic plug functioning as at least one of a mobile network modem, a ZigBee dongle, or a Bluetooth dongle, for example, may be used in an electronic device that is connected to a network device via an Ethernet cable. Examples of the network device may include, but are not limited to, switches, routers, hubs, or the like. In one or more examples, the electronic plug may be a universal serial bus (USB) plug and the electronic device may be an access point. Typically, the access point has an electronic port, such as a USB port for providing connectivity with the USB plug. In such examples, the USB plug may be easily connected to the access point by way of plugging-in to the USB port. However, removing the USB plug from the access point may also be as easy by way of removing it from the USB port. Thus, making the USB plug an easy target for unauthorized removal and/or theft from the access point. Some previous approaches to secure the USB plug include using an external locking mechanism to secure the USB plug within the access point. However, such external locking mechanism may complicate an authorized removal of the USB plug from the access point. Additionally, a data center, for example, may include several USB plugs in close proximity to one another, thus using the external locking mechanism for securing each of the several USB plugs may become complicated and tedious process. Further, the external locking mechanism are typically bulky in nature, thus making it difficult to use in the access point having space constraints. Accordingly, the usage of the external locking mechanism to secure the USB plug to the access point may be cumbersome or may not be cost effective.

A technical solution to the aforementioned problems may include providing a locking assembly having locking elements disposed within an electronic port for preventing unauthorized removal and/or theft of an electronic plug connected to the electronic port of an electronic device. The locking assembly may occupy substantially little space due to integration of the locking elements with one or more existing components of the electronic port. Further, the locking elements may have a complementary design to that of the one or more existing components of the electronic port. Thus, the locking assembly may have a simple design. Accordingly, the locking assembly disclosed herein, is self-contained and may not use additional elements external to the electronic port for securing the electronic plug within the electronic device. In some examples, the electronic device may be an access point, the electronic port may be a universal serial bus (USB) port, and the electronic plug may be a USB plug.

In some examples, the USB port may include a receptacle and a locking assembly having locking elements, such as a rocker switch, a bracket, an elastic arm, and a fastener. In such examples, the locking elements may collectively work in tandem to secure (or lock) the USB plug connected to the USB port. In one or more examples, the receptacle of the USB port may be an existing component of the USB port, whereas the bracket and the elastic arm are internal locking elements of the USB port, and the rocker switch and the fastener are external locking elements of the USB port. In such examples, the plurality of such locking elements may collectively work for locking the USB plug within the USB port and/or unlocking the USB plug from the USB port. In one or more examples, the USB plug may include a connector, which may also be an existing component of the USB plug.

The receptacle of the USB port may include a plurality of retainers to releasably connect and hold the connector, when the USB plug is detachably coupled to the USB port. The rocker switch of the locking assembly may be pivotably connected to the enclosure to have a seesaw motion relative to the enclosure for controlling the locking of the USB plug within the USB port and/or unlocking the USB plug from the USB port. The bracket of the locking assembly may extend from the rocker switch and disposed around a first end portion of the receptacle. Further, the elastic arm of the locking assembly may include a locking tab and a resting tab, where the resting tab may be seated on a second end portion of the receptacle, and the locking tab having a pair of lock features, may be engaged with the bracket. In one or more examples, when the elastic arm is in a relaxed state, the locking tab may cause the pair of lock features to protrude into the receptacle. More particularly, the pair of lock features may engage with the pair of counter lock features in a connector of the electronic plug, when the USB plug is connected to the USB port. Thus, preventing a movement of the connector out of the receptacle, and thereby locking (retaining) the electronic plug within the electronic port.

In some examples, the bracket may have a shell portion disposed around the first end portion of the receptacle. In such examples, a bottom section of the shell portion may be formed of a pair of oppositely inclined tabs. In one or more examples, the pair of oppositely inclined tabs may be bent inwards facing a top section of the shell portion. In such examples, the pair of oppositely inclined tabs may act as a spring to bias the shell portion against the first end portion of the receptacle. Accordingly, the pair of oppositely inclined tabs may cause the bracket to move downwards during the relaxed state of the elastic arm, thereby aiding the elastic arm interfering with the bracket, to protrude into the receptacle and engage the pair of lock features with the pair of counter lock features for locking the USB plug within the USB port.

The pair of lock features of the locking tab may be pulled out of the receptacle, when the elastic arm moves to a biased state from the relaxed state. More particularly, the pair of lock features may get disengaged from the pair of counter lock features, when the elastic arm is in the biased state. Thus allowing the movement of the connector out of the receptacle, and thereby unlocking the electronic plug from the electronic port. In one or more examples, the bracket interfering with the locking tab may also get pulled upwards, when the elastic arm moves to the biased state. Accordingly, the pair of oppositely inclined tabs biased against the first end portion of the receptacle flattens up to allow the bracket to move upwards. Thus, allowing the elastic arm interfering with the bracket to disengage the pair of lock features from the pair of counter lock features, and pull the pair of lock features out of the receptacle for releasing the USB plug from the USB port.

In some examples, a depression force may be applied on the rocker switch to induce the seesaw motion on the rocker switch along a first direction. Thereby, causing the bracket to move upwards, the elastic arm to deform (or bend), and the locking tab having the pair of lock features to disengage from the pair of counter lock features of the connector, and pull out of the receptacle. Similarly, the depressing force may be applied on the rocker switch to induce a seesaw motion of the rocker switch along a second direction opposite to the first direction. Thereby causing the bracket to move downwards, the elastic arm to relax, and the locking tab having the pair of lock features to protrude into the receptacle and the pair of counter lock features of the connector.

Turning to the Figures, FIG. 1A depicts an exploded view of an electronic device 100. FIG. 1B depicts an assembled view of the electronic device 100. FIG. 1C depicts a cross-sectional view of the electronic device taken along line 1-1' in FIG. 1B. In some examples, the electronic device 100 may be an access point 100A that may be configured to create a wireless local area network (WLAN). In some other examples, the electronic device 100 may be a server device, a storage device, a power conversion device, a communication device, or a networking device, or the like without deviating from the scope of the present disclosure. In one or more examples, the electronic device 100 includes an electronic port 102, the electronic plug 104, and an enclosure 106. In some examples, the electronic port 102 may be a universal serial bus (USB) port 102A, the electronic plug 104 may be a USB plug 104A, and the enclosure 106 is a box like component configured to house the USB port 102A. In such examples, the USB port 102A includes a receptacle 108, a circuit board 110, and a locking assembly 112. In some examples, the locking assembly 112 includes a bracket 114, an elastic arm 116, a rocker switch 118, and a fastener 120.

In one or more examples, the USB port 102A may have a standard cable connection interface for networking device (not shown), such as switches, routers, or hubs, and a receptacle 108 for receiving the USB plug 104A. For example, the USB port 102A may have the receptacle 108, and the USB plug 104A may have a connector 138 to establish a connection there between. In some other examples, the USB port 102A may be configured for supplying an electric power to one or more external devices (not shown) via the USB plug 104A connected to the USB port 102A.

Figures 2A, 2B, 2C:
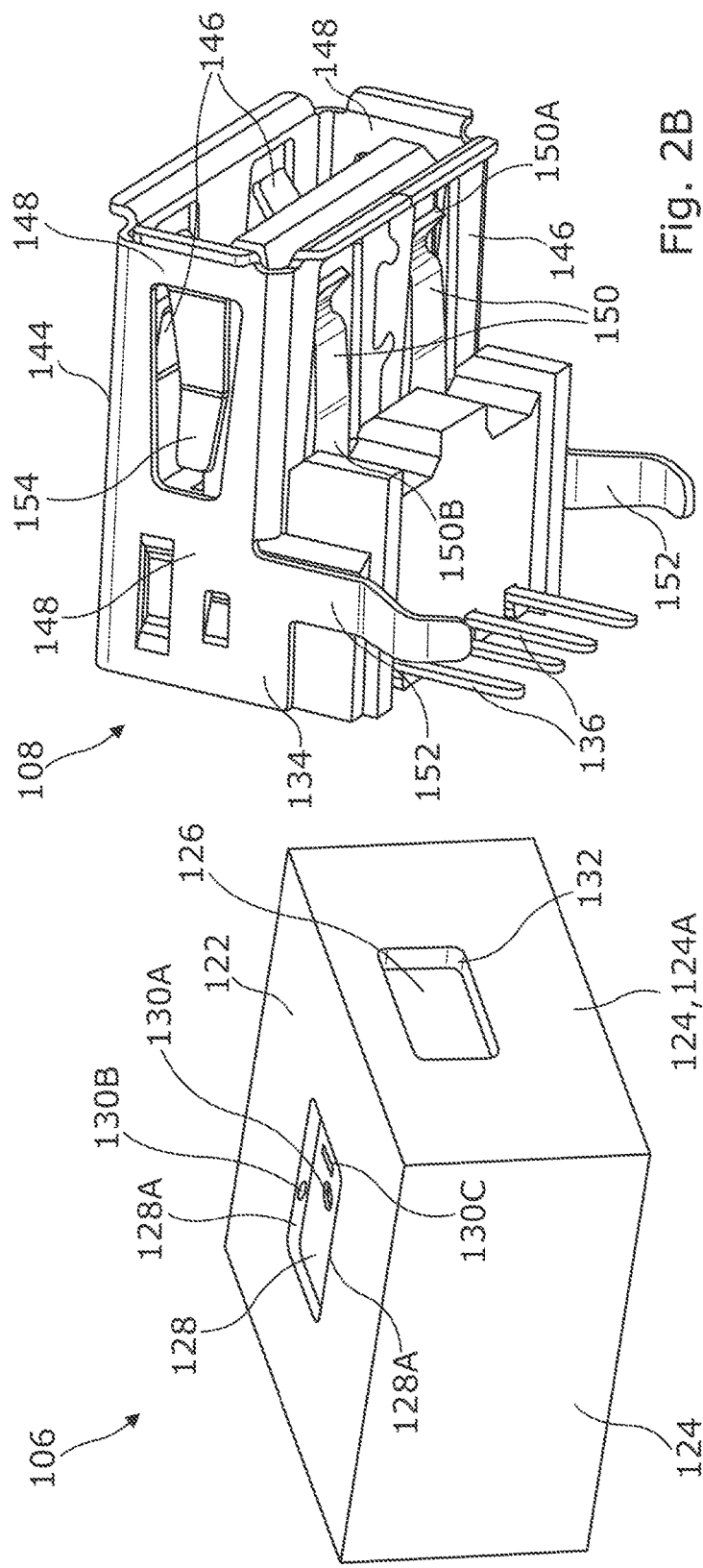
FIG. 2A illustrates an isometric view of a housing in the electronic device of FIGS. 1A and 1B according to an example implementation of the present disclosure.
FIG. 2B illustrates an isometric view of a receptacle of the electronic port of FIGS. 1A and 1B according to an example implementation of the present disclosure.
FIG. 2C illustrates an isometric view of a circuit board of the electronic port of FIGS. 1A and 1B according to an example implementation of the present disclosure.

In one or more examples, the USB port 102A may be disposed within the enclosure 106, and may get releasably connected to the USB plug 104A, when the connector 138 is plugged to (inserted into) the receptacle 108, as shown in FIGS. 1B-1C. An isometric view of the enclosure 106 shown in FIGS. 1A-1C is further depicted in an enlarged view in FIG. 2A. Referring to FIG. 2A, the enclosure 106 may be part of another network device, such as another access point or coupled to a support structure of the other access point. It may be noted herein that the enclosure 106 is shown as a transparent structure in the example of FIGS. 1B-1C to depict assembled locking elements and existing components of the USB port 102A and USB plug 104A, and such an illustration should not be construed as a limitation of the present disclosure. In one or more examples, the enclosure 106 is formed by a cover 122, a base (not labeled), and a plurality of peripheral walls 124, which are coupled to one another to define a hollow space 126 there between. The cover 122 includes a seat-out depression 128 extending downwards from a top surface of the cover 122. The seat-out depression 128 may have an outer design feature, which is complementary to that of an outer design feature of the rocker switch 118 of the electronic port 102. In the example of FIG. 2A, the seat-out depression 128 has a rectangular shaped outer design. Further, the enclosure 106 has a hanging section 130 (shown in FIG. 1C) that extends downwards from a bottom surface of the cover 122 and positioned at a mid-portion of the seat-out depression 128. In such examples, the enclosure 106 has a bore 130A that extends from an upper surface of the seat-out depression 128 to the enclosure 106 via the hanging section 130. In some examples, the bore 130A has a first diameter "$D_1$" and includes threads to allow the fastener 120 having complementary threads to fasten through the bore 130A.

Further, the enclosure 106 has a pair of pivotal openings 130B (only one pivotal opening is shown in FIG. 2A) in a pair of mutually opposite lateral walls 128A of the seat-out depression 128. Each pivotal opening 130B may be characterized as a hole in its respective lateral wall 128A and each extends laterally inwards from the surface of its respective lateral wall 128A. The pair of pivotal openings 130B may enable the rocker switch 118 to establish pivotal connection with the enclosure 106 (as seen in FIG. 1B). In some examples, the enclosure 106 may further include an elongated opening 130C formed proximate to the bore 130A for allowing a section of the bracket 114 to protrude outside the enclosure 106 from the hollow space 126 of the enclosure 106. In some examples, the enclosure 106 further has a cut-out 132 on one peripheral wall 124A of the plurality of peripheral walls 124, where the cut-out 132 extends longitudinally from an exterior of the peripheral wall 124A to the hollow space 126 of the enclosure 106. As used herein the term "longitudinal" may refer to a direction that is parallel to the direction of movement of the USB plug 104A into the USB port 102A. The cut-out 132 may have an outer design feature, which is complementary to that of the outer design feature of the connector 138 of the electronic plug 104. For example, in the example of FIGS. 1A and 2A, the cut-out 132 has a rectangular shaped outer design.

An isometric view of the receptacle 108 shown in FIGS. 1A-1C is further depicted in an enlarged view in FIG. 2B. Referring to FIG. 2B, the receptacle 108 has a shell 134, and a plurality of conductors 136 configured to interface/connect with the connector 138 of the USB plug 104A and the circuit board 110. In some examples, the shell 134 includes a cover portion 144, a bottom portion 146, and a pair of peripheral walls 148, which are coupled to one another to define a hollow space there between for receiving the connector 138 of the USB plug 104A. In one or more examples, each of the cover portion 144 and the bottom portion 146 of the shell 134 may have a plurality of retainers 150. In the example of FIG. 2B, each of the cover portion 144 and the bottom portion 146 may have two retainers 150 that are disposed adjacent to each other. Each retainer of the plurality of retainers 150 may be formed around a recess (not labeled) on the cover portion 144 and the bottom portion 146, such that they have cantilevered structure including a freely suspended portion 150A and a fixed portion 150B. The receptacle 108 may further include a pair of support elements 152 and a peripheral support mechanism 154 in order to provide support to the receptacle 108 within the enclosure 106.

In one or more examples, an isometric view of the circuit board 110 shown in FIGS. 1A-1C is further depicted in an enlarged view in FIG. 2C. Referring to FIG. 2C, the circuit board 110 may be made of a substrate 156. Further, the circuit board 110 may have one or more processing resources (not shown) coupled to the substrate 156, and traces (not shown) formed in the substrate 156 such that the traces are connected to pads/leads (not shown) of the one or more processing resources. In the example of FIG. 2C, the circuit board 110 further has a plurality of openings 158 for receiving the plurality of conductors 136 of the receptacle 108 (as shown in FIGS. 1A and 2B) and coupling the plurality of conductors 136 to the traces in the circuit board 110. In such examples, the plurality of conductors 136 may further interface with a plurality of conductors (not shown) of the USB plug 104A. Thus, the circuit board 110 may receive digital data from the USB plug 104A via the USB port 102A and the plurality of conductors 136, process the received data, and transmit the processed data to the networking device. The circuit board 110 further has a pair of support openings 160 that is configured to receive and clamp the pair of support elements 152 of the receptacle 108, so as to support the receptacle 108 within the enclosure 106 via the circuit board 110.

Figure 2E:
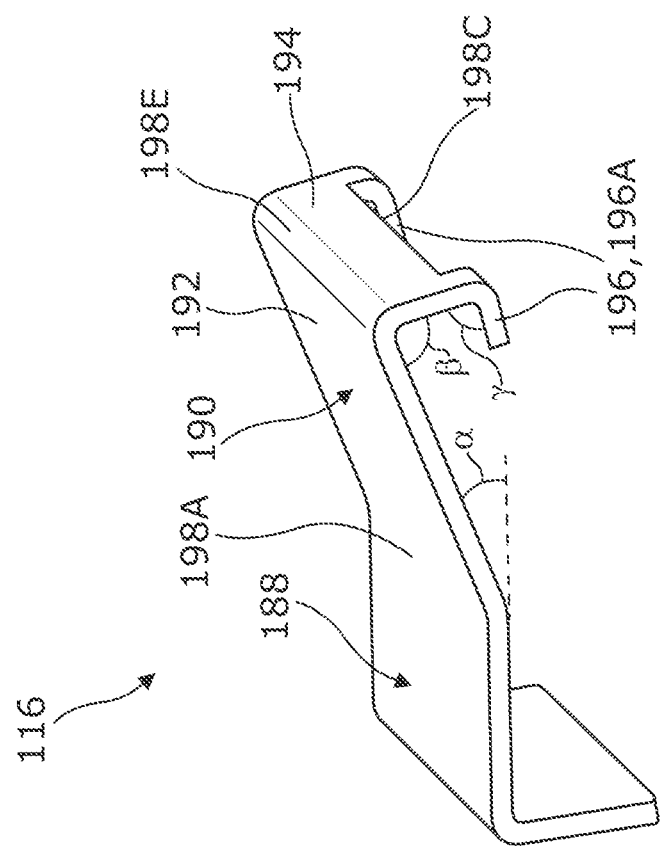
FIG. 2E illustrates an isometric view of an elastic arm of a locking assembly in the electronic port of FIGS. 1A and 1B according to an example implementation of the present disclosure.
Figure 2D:
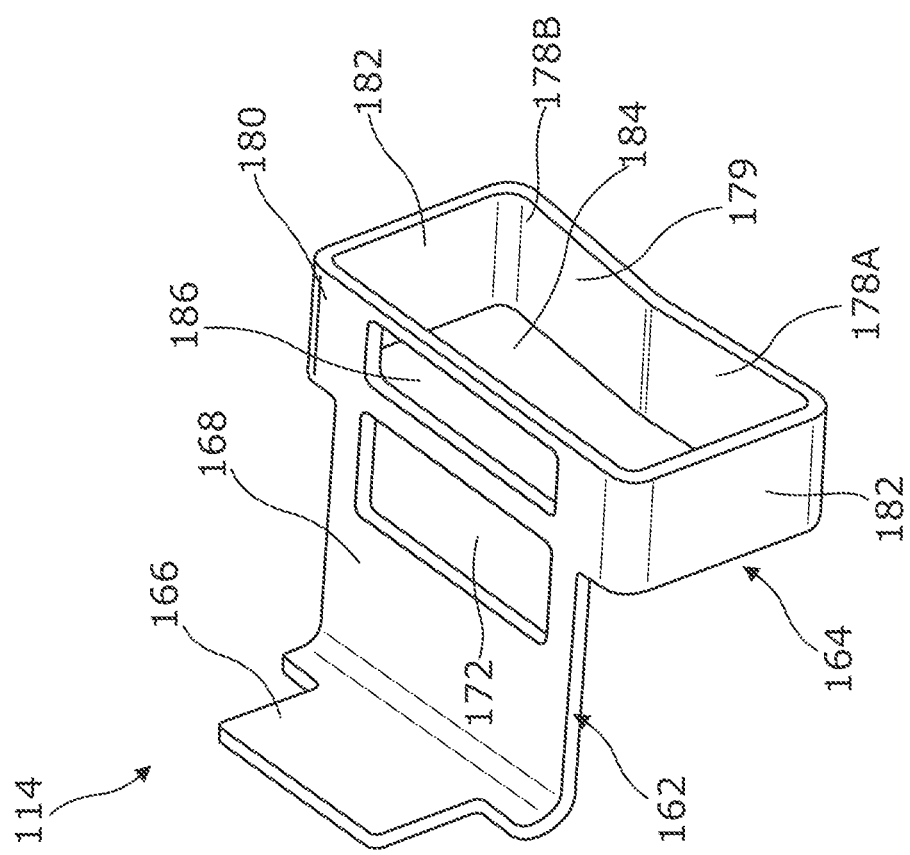
FIG. 2D illustrates an isometric view of a bracket of a locking assembly in the electronic port of FIGS. 1A and 1B according to an example implementation of the present disclosure.

In one or more examples, an isometric view of the bracket 114 shown in FIGS. 1A-1C is further depicted in an enlarged view in FIG. 2D. Referring to FIG. 2D, the bracket 114 is one of a locking element of the locking assembly 112 in the USB port 102A. The bracket 114 may have rigid portions made of metallic materials, and flexible portions made of deformable materials. The bracket 114 includes a protruded portion 162 and a shell portion 164 extending from the protruded portion 162. In some examples, the protruded portion 162 includes a vertical section 166 and a horizontal section 168. As used herein, the term "vertical section" may refer to a section that is protruding along a direction that is perpendicular to a direction of movement of the USB plug 104A into the USB port 102A. Further, the term "horizontal section" may refer to another section that is protruding along the direction that is parallel to the direction of the movement of the USB plug 104A into the USB port 102A. In some examples, the vertical section 166 extends from an elongated hole 170 formed in the rocker switch 118 (as shown in FIG. 1C), and connected to the horizontal section 168. In such examples, the horizontal section 168 is further connected to the shell portion 164. In one or more examples, the vertical section 166 is a flexible member that may be bendable in a biased state of the elastic arm 116, and the horizontal section 168 is a rigid member. The horizontal section 168 has a first through-hole 172 for engaging with the elastic arm 116. For example, a locking tab 190 of the elastic arm 116 extends through the first through-hole 172 (as shown in FIG. 1C) to engage with the bracket 114. The shell portion 164 is disposed around a first end portion 174 of the receptacle 108 (or the shell 134), as shown in FIG. 1B. The shell portion 164 has a bottom section 178 and a top section 180 coupled to one another via a pair of walls 182. In other words, the pair of walls 182, the top section 180, and the bottom section 178 are coupled to one another to define an opening 184 there between. In such examples, the first end portion 174 of the receptacle 108 (or the shell 134 of the receptacle 108) is disposed within the opening 184. In some examples, the top section 180 has a second through-hole 186 for further engaging with the elastic arm 116. For example, the locking tab 190 of the elastic arm 116, extends through the second through-hole 186 (as shown in FIG. 1C) to further engage with the bracket 114. In one or more examples, the top section 180 and the pair of walls 182 of the shell portion 164, are rigid members. However, the bottom section 178 of the shell portion 164 is another flexible member formed by a pair of oppositely inclined tabs 178A, 178B. In some examples, the pair of oppositely inclined tabs 178A, 178B is bent towards a center of the bottom section 178. For example, each tab of the pair of oppositely inclined tabs 178A, 178B bends inwardly facing the top section 180 of the shell portion 164. The pair of oppositely inclined tabs 178A, 178B is in contact with the bottom portion 146 of the receptacle 108, during a relaxed state of the elastic arm 116. Further, the pair of oppositely inclined tabs 178A, 178B fattens out by pressing against the bottom portion 146 of the receptacle 108, during the biased state of the elastic arm 116.

FIG. 2E depicts an isometric view of the elastic arm 116 shown in FIGS. 1A-1C. Referring to FIG. 2E, the elastic arm 116 is another locking element of the locking assembly 112 in the USB port 102A. The elastic arm 116 may have flexible portions made of deformable materials. The elastic arm 116 includes a resting tab 188 and the locking tab 190 extending from the resting tab 188. In some examples, the resting tab 188 may be a rigid member, which may be seated on a second end portion 176 of the receptacle 108 (as shown in FIGS. 1B-1C). In one or more examples, the locking tab 190 includes an inclined section 192 and a pillar section 194 extending from the inclined section 192. In some examples, the inclined section 192 is a flexible section, which may be bendable in the biased state of the elastic arm 116. The inclined section 192 protrudes upwards at an angle "α" from an intersection region 198A of the resting tab 188 and the inclined section 192. In some examples, the angle "α" may be between "30" to "45" degrees. The pillar section 194 may be a rigid member, which protrudes downwards from another intersection region 198B of the inclined section 192 and the pillar section 194 at an angle "β". In some examples, the angle "β" may be between "85" to "95" degrees. Further, the pillar section 194 has a pair of lock features 196 extending from an end region 198C of the pillar section 194 at an angle "γ". In some examples, the angle "γ" may be between "85" to "95" degrees. The pair of lock features 196 is disposed facing the resting tab 188. In one or more examples, the pair of lock features 196 is a pair of prongs 196A. As discussed hereinabove, the inclined section 192 of the elastic arm 116 may protrude via the first through-hole 172 of the bracket 114 so as to engage the locking tab 190 with the bracket 114 (as shown in FIG. 1C). Further, the pillar section 194 of the elastic arm 116 may protrude via the second through-hole 186 of the bracket 114 so as to further engage the locking tab 190 with the bracket 114 (as shown in FIG. 1C). In one or more examples, the inclined section 192 is deformable (or bendable) relative to the intersection region 198A to pull the pillar section 194 having the pair of lock features 196 out of the receptacle 108 in the biased state of the elastic arm 116. Similarly, the inclined section 192 is retractable relative to the intersection region 198A to protrude the pillar section 194 having the pair of lock features 196 into the receptacle 108 in the relaxed state of the elastic arm 116.

Figure 2G:
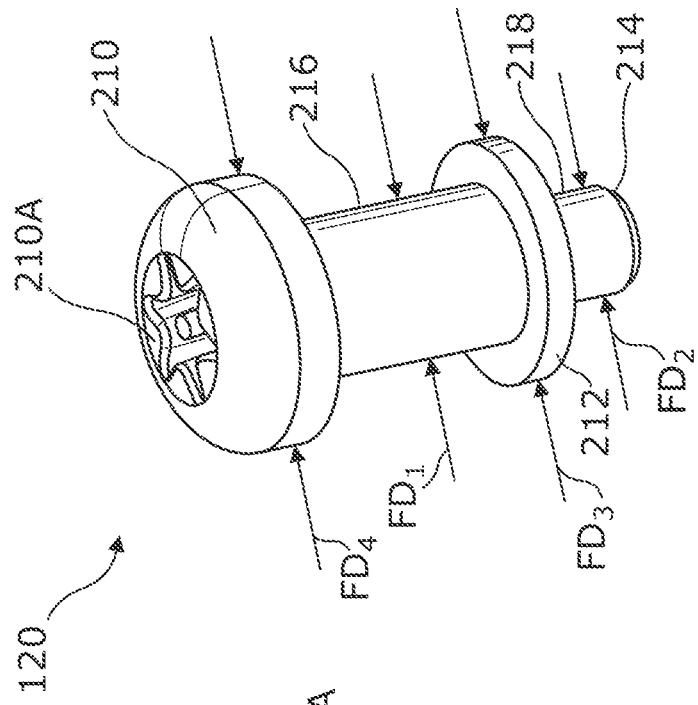
FIG. 2G illustrates an isometric view of a fastener of a locking assembly in the electronic port of FIGS. 1A and 1B according to an example implementation of the present disclosure.
Figure 2F:
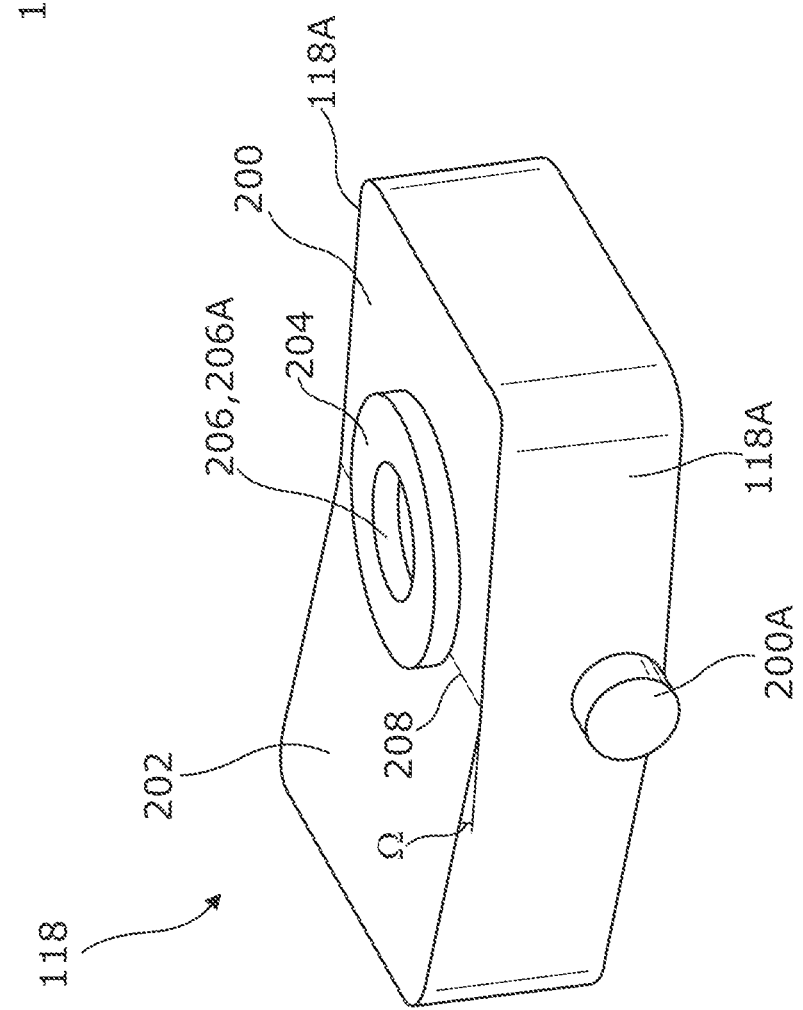
FIG. 2F illustrates an isometric view of a rocker switch of a locking assembly in the electronic port of FIGS. 1A and 1B according to an example implementation of the present disclosure.

In one or more examples, an isometric view of the rocker switch 118 shown in FIGS. 1A-1C is further depicted in an enlarged view in FIG. 2F. Referring to FIG. 2F, the rocker switch 118 is yet another locking element of the locking assembly 112 in the USB port 102A. The rocker switch 118 may include a horizontal section 200 and a slope section 202 connected to the horizontal section 200. In some examples, the rocker switch 118 may have an outer design feature, which is complementary to that of the outer design feature of the seat-out depression 128 (as shown in FIG. 2A) of the enclosure 106. In the example of FIG. 2F, the rocker switch 118 may have the rectangular shaped outer design.

Referring to FIG. 1C along with FIG. 2F, the horizontal section 200 of the rocket switch 118 includes a raised section 204 that extends upwards from a top surface of the rocker switch 118 and positioned at an end-portion of the horizontal section 200. In such examples, the horizontal section 200 further has a counter bore 206 that extends from an upper surface of the raised section 204 to a bottom surface of the rocker switch 118. In some examples, a first bore portion 206A of the counter bore 206 is formed from the top surface of the raised section 204, and has a second diameter "$D_2$". Similarly, a second bore portion 206B of the counter bore 206 is formed from the bottom surface of the rocker switch 118 and has a third diameter "$D_3$". In some examples, the third diameter "$D_3$" is substantially greater than the second diameter "$D_2$". Additionally, the counter bore 206 may have threads to allow the fastener 120 having complementary threads to extend through it. In all such examples, the counter bore 206 formed in the rocker switch 118 may be further aligned with the bore 130A formed in the enclosure 106, when the rocker switch 118 is mounted on and pivotally connected to the enclosure 106. In such examples, the first diameter "$D_1$" of the bore 130A may be substantially smaller than the second and third diameters "$D_2$", "$D_3$" of the first and second bore portions 206A, 206B respectively. As mentioned hereinabove, the rocker switch 118 may further have the elongated hole 170 formed at a bottom surface of the rocker switch 118 (as shown in FIG. 1C). In such examples, the vertical section 166 of the bracket 114 may extend from the elongated hole 170 in the rocker switch 118. Referring back to FIG. 2F, the horizontal section 200 of the rocker switch 118 further includes a pair of pivotal pins 200A (only one pivotal pin is shown in FIG. 2F) that extends laterally outwards from a pair of mutually opposite lateral walls 118A of the rocker switch 118. The pair of pivotal pins 200A may engage with the pair of pivotal openings 130B (shown in FIG. 1C) to enable the rocker switch 118 to establish a pivotal connection with the enclosure 106.

The slope section 202 of the rocker switch 118, is inclined at an angle "Ω" from an intersection region 208 between the horizontal section 200 and the slope section 202. In some examples, the angle "Ω" may be between "15" to "20" degrees. In some examples, the slope section 202 inclined from the horizontal section 200 may enable the rocker switch 118 to have a seesaw motion relative to the pivotal connection with the enclosure 106.

In one or more examples, an isometric view of the fastener 120 of FIGS. 1A-1C is further depicted in an enlarged view in FIG. 2G. Referring to FIG. 2G, the fastener 120 is yet another locking element of the locking assembly 112 in the USB port 102A. In some examples, the fastener 120 is a captive screw. It may be noted herein that the captive screw is a special type of screw that may remain freely inside an opening of an object without getting lost from the object, and at the same time it may be selectively fastened or unfastened to lock or unlock to/from another object or another portion of the same object. In some examples, the fastener 120 includes a head portion 210, an intermediary portion 212, an end portion 214, a first body portion 216, and a second body portion 218. The head portion 210 may have a unique shaped groove head 210A. For example, in the illustrated example of FIG. 2G, the unique shaped groove head 210A is a Torx shaped groove head, for example, a Torx T8H shaped groove head.

The first body portion 216 has the first diameter "$FD_1$", the second first body portion 218 has the second diameter "$FD_2$", the intermediary portion 212 has a third diameter "$FD_3$", and the head portion 210 has a fourth diameter "$FD_4$". The second diameter "$FD_2$" is substantially equal to that of diameter "$D_1$" of the bore 130A, and the first diameter "$FD_1$" is substantially equal to that of second diameter "$D_2$" of the first bore portion 206A. Further, the third diameter "$FD_3$" is substantially equal to that of the third diameter "$D_3$" of the second bore portion 206B and substantially greater than the first diameter "$D_1$" of the first bore portion 206A so as to retain the fastener 120 within the counter bore 206 of the rocker switch 118.

The fastener 120 may be disposed in the counter bore 206 of the rocker switch 118, such that the first body portion 216 may fasten through the first bore portion 206A, and the second body portion 218 and the intermediary portion 212 may be freely positioned in the second bore portion 206B. In such examples, a non-conventional shaped driver (not shown) having a unique shaped complementary groove head (for example, Torx T8H shaped complementary groove head), may fit-in to the unique shaped groove head 210A for driving the second body portion 218 of the fastener 120 to fasten into and/or unfasten from the object, for example, the bore 130A of the enclosure 106. In one or more examples, the fastener 120 may be fastened into the enclosure 106 to restrict the seesaw motion of the rocker switch 118 used for controlling the movement of the elastic arm between the relaxed state to the biased state.

Referring back to FIGS. 1B-1C, the receptacle 108 may be coupled to the circuit board 110, such that pair of support elements 152 protrudes through the pair of support openings 160 in the circuit board 110. Further, the locking tab 190 of the elastic arm 116, is engaged with the bracket 114, and the resting tab 188 of the elastic arm 116 is seated on the second end portion 176 of the receptacle 108. The bracket 114 is disposed around the receptacle such that the shell portion 164 of the bracket 114 is around the first end portion 174 of the shell 134 in the receptacle 108. In such examples, the bottom section 178 of the shell portion 164 in a relaxed state is in contact with the bottom portion 146 of the shell 134. Further, the pair of lock features 196 of the locking tab 190 is protruded into the receptacle 108 (as shown in FIG. 5), since the locking tab 190 of the elastic arm 116, in a relaxed state is engaged with the bracket 114. Further, a sub-assembly of the receptacle 108, the circuit board 110, the bracket 114, and the elastic arm 116 are positioned within the enclosure 106 such that i) the receptacle 108 faces the cut-out 132 in the enclosure 106, and ii) and vertical section 166 of the bracket 114 protrudes outside the enclosure 106 via the elongated opening 130C in the enclosure 106. In such example, such sub-assembly may be supported within the enclosure 106 by a plurality of support elements (not shown) of the enclosure 106. Later, the rocker switch 118 is mounted on the seat-out depression 128 formed on the cover 122 of the enclosure 106 such that the rocker switch 118 is pivotably connected to the enclosure 106. For example, the pair of pivotal pins 200A in the rocker switch 118 is plugged to the pair of pivotal openings 130B in the enclosure 106 to form the pivot connection there between. In such examples, the vertical section 166 of the bracket 114 protrudes into the elongated hole 170 formed in the rocker switch 118 so as to allow the bracket 114 to extend from the rocker switch 118. Further, the bore 130A in the enclosure 106 is aligned with the second bore portion 206B of the counter bore 206 in the rocker switch 118.

Referring to FIGS. 1B-1C, the USB plug 104A may be detachably coupled to USB port 102A. For example, the connector 138 of the USB plug 104A is releasably connected to the receptacle 108 of the USB port 102A. In such examples, the pair of lock features 196 (as shown in FIG. 5) of the locking tab 190 is protruded into a) the receptacle 108 and b) the plurality of counter lock features 226 (as shown in FIG. 5) of the connector 138, in order to prevent a movement of the USB plug 104A out of the USB port 102A. Thus, allowing the locking assembly 112 to lock the USB plug 104A within the access point 100A, and prevent any unauthorized removal and/or or theft of the USB plug 104A from the access point 100A.

Figure 3:
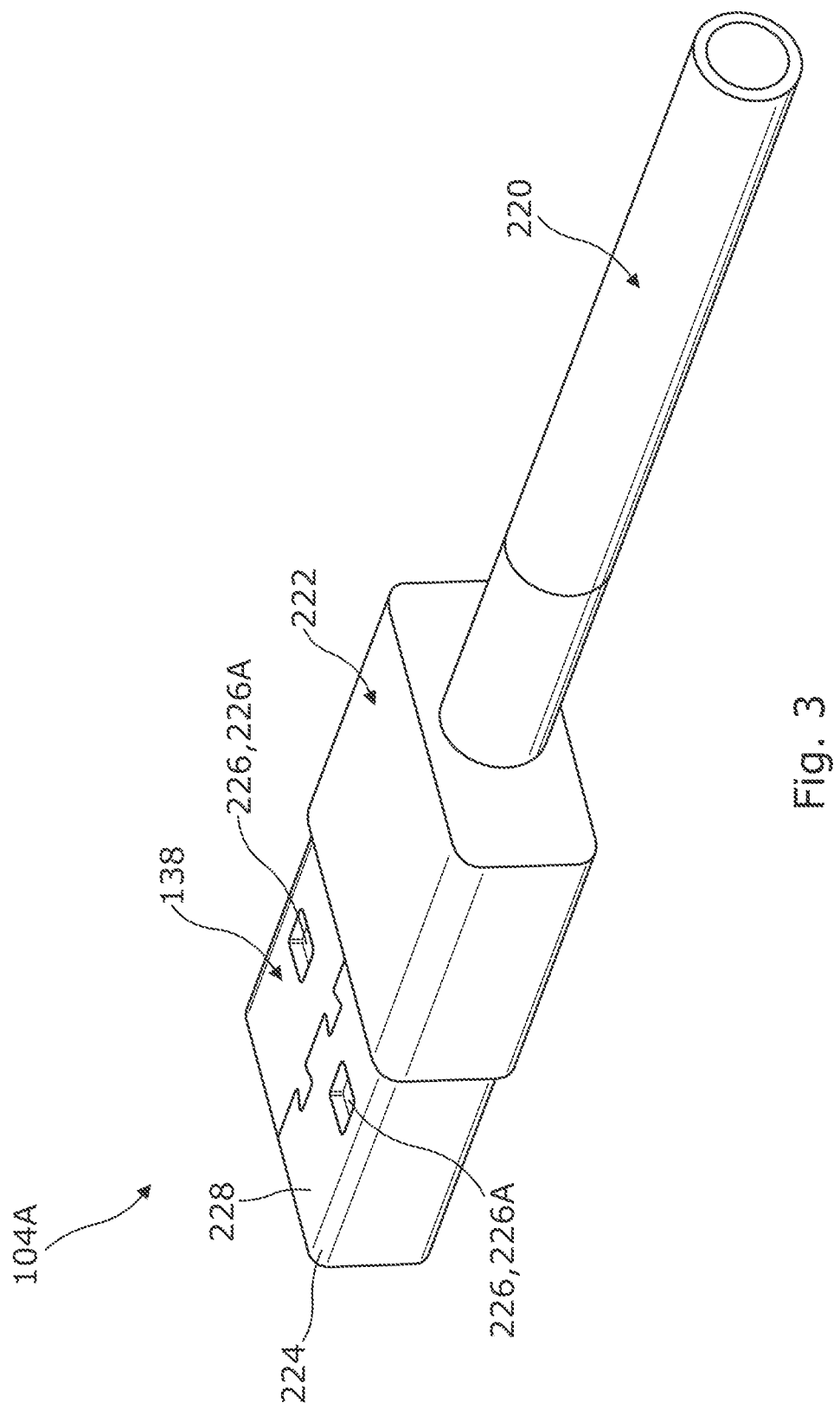
FIG. 3 illustrates an isometric view of the electronic plug in the electronic device of FIGS. 1A and 1B according to an example implementation of the present disclosure.

FIG. 3 depicts an isometric view of the USB plug 104A shown in FIGS. 1A-1C. In one or more examples, the connector 138 may be the existing component of the USB plug 104A. The USB plug 104A may further include a USB cable 220, which may be held together by a mold portion 222. The connector 138 has a shell 224 and a plurality of conductors (not shown) disposed within the shell 224. The plurality of conductors may be configured to interface/connect with the plurality of conductors 136 of the receptacle 108 and the USB cable 220. In one or more examples, the shell 224 of the connector 138 is inserted into the hollow space of the receptacle 108, when the USB plug 104A is plugged into the USB port 102A. In some examples, the shell 224 may include the pair of counter lock features 226, for example, a pair of recesses 226A formed on a cover 228 of the connector 138 and disposed adjacent to one another.

FIG. 4 depicts a cross-sectional view of the access point 100A of FIGS. 1B-1C having the USB plug 104A connected to the USB port 102A, and retained in an unlocked stage within the USB port 102A.

The USB plug 104A is detachably coupled to the access point 100A byway of plugging-in of the connector 138 of the USB plug 104A into the receptacle 108 of the USB port 102A via the cut-out 132 in the enclosure 106. For example, an insertion force may be applied on the USB plug 104A to move the connector 138 inside the receptacle 108 via the cut-out 132. In such examples, the connector 138 may first contact the plurality of lock features 196 that is protruded into the receptacle 108. At that instance, a further application of the insertion force on the USB plug 104A may cause the connector 138 to push the plurality of lock features 196 to move out of the receptacle 108, thereby allowing the connector 138 to move further inside the receptacle 108. In one or more examples, the locking tab 190 of the elastic arm 116 deforms (or bends) to pull the plurality of lock features 196 out of the receptacle 108. In such examples, the elastic arm 116 engaged with the bracket 114 causes the bracket 114 to move upwards. In some examples, the pair of oppositely inclined tabs 178A, 178B of the shell portion 164 may get flattened to allow the bracket 114 to move upwards, when the plurality of lock features 196 pulls out of the receptacle 108. In such examples, the upward movement of the bracket 114 causes the vertical section 166 of the bracket 114 to bend within the elongated hole 170 of the rocker switch 118, thereby causing the rocker switch 118 to have a seesaw motion along a first direction 40. In some examples, the first direction 40 is a counter clockwise direction. In one or more examples, the elastic arm 116 is deformable based on movement of the connector 138 into the receptacle 108 to allow the movement of the connector 138 into the receptacle 108.

In such examples, the fastener 120 disposed within the counter bore (not shown) of the rocker switch 118, may not be fastened into the bore 130A of the enclosure 106. Thus, allowing the vertical section 166 of the bracket 114 to cause the seesaw of the rocker switch 118 along the first direction 40. It may be noted herein that the slope section 202 of the rocker switch 118 may have moved a distance "L" based on the seesaw motion of the rocker switch 118 along the first direction 40.

At that instance, the further application of the insertion force on the USB plug 104A may cause the connector 138 to further contact and push the pair of retainers 150 in the receptacle 108 to move upwards. Thereby, allowing the connector 138 to move further inside the receptacle 108. Once, the pair of retainers 150 of the receptacle 108 aligns with the pair of counter lock features 226 in the connector 138, the pair of retainers 150 may move to relaxed state and releasably hold the connector 138 within the USB port 102A. For example, the plurality of retainers 150 may get engaged with the plurality of counter lock features 226 of the connector 138 in order to releasably hold the USB plug 104A within the USB port 102A. In some examples, the elastic arm 116 may be held in the biased state until the plurality of counter lock features 226 in the connector 138 is aligned with the plurality of retainers 150 in the receptacle 108. Since the elastic arm 116 is still in the biased state, the pair of lock features 196 is not engaged with the pair of counter lock features, thereby allowing the movement of the connector 138 into the receptacle 108. As used herein, the term "biased state" may refer to the unlock stage of the USB port 102A, where the elastic arm 116 is deformed, the bracket 114 is positioned vertically upwards, and the slope section 202 of the rocker switch 118 is in contact the enclosure 106.

In some other examples, the elastic arm 116 may be deformed (bent) based on an upward movement of the bracket 114 caused by the seesaw motion of the rocker switch 118 along the first direction 40. In such examples, the seesaw motion of the rocker switch 118 may be caused by the application of a depression force on the slope section 202 of the rocker switch 118.

FIG. 5 depicts a cross-sectional view of the access point 100A of FIGS. 1B-1C. In particular, FIG. 5 represents the locked stage of the USB plug 104A within the USB port 102A, which has transitioned from the unlocked stage of the USB plug 104A within the USB port 102A, as depicted in FIG. 4. When the pair of counter lock features 226 in the connector 138 is aligned with the plurality of retainers 150 in the receptacle 108, the elastic arm 116 may move from the biased state to the relaxed state. For example, the elastic arm 116 may move from biased state to relaxed state, so as to push the pair of lock features 196 to protrude into the receptacle 108, and engage with the pair of counter lock features 226. In one or more examples, when the pair of counter lock features 226 is aligned with the plurality of retainers 150, the pair of oppositely inclined tabs 178A, 178B of the shell portion 164 moves inwards so as to pull the bracket 114 downwards, and allow the locking tab 190 to protrude into the receptacle 108 and engage the pair of lock features 196 with the pair of counter lock features 226. Thereby, preventing the movement of the connector 138 out of the receptacle 108. In other words, the application of a withdrawal force on the USB plug 104A may cause the plurality of retainers 150 to move upwards so as to disengage from the pair of counter lock features 226 and release the USB plug 104A. However, the pair of lock features 196 may still be engaged with the pair of counter lock features 226, thereby preventing the movement of the connector 138 out of the receptacle 108.

In some examples, the movement of the elastic arm 116 to the relaxed state causes the bracket 114, which is engaged to the locking tab 190 of the elastic arm 116, to move downward. In such examples, the downward movement of the bracket 114 causes the vertical section 166 of the bracket 114 to return from the biased state to a relaxed state, thereby inducing the seesaw motion in the rocker switch 118 along a second direction 50 opposite to the first direction 40. In some examples, the second direction 50 is a clockwise direction. It may be noted herein that the horizontal section 200 of the rocker switch 118 may move a distance "$L_2$" based on the seesaw motion of the rocker switch 118 along the second direction 50.

In one or more examples, when the plurality of retainers 150 of the receptacle 108, and the pair of lock features 196 of the elastic arm 116 are engaged with the plurality of counter lock features 226 of the connector 138, the fastener 120 disposed in the counter bore 206 (as shown in FIG. 1C) of the rocker switch 118 may be fastened to the enclosure 106. For example, a non-conventional shaped driver (not shown) having a unique shaped complementary groove head (for example, Torx T8H shaped complementary groove head) may be used to fasten the fastener 120 to the bore 130A of the enclosure 106. In particular, the first body portion 216 of the fastener 120 may be engaged with the bore 130A of the enclosure to restrict the slope section 202 of the rocker switch 118 to move along the first direction 40 in order to i) deform the elastic arm 116, and ii) pull the pair of lock features 196 out of the pair of counter lock features 226. Thereby, preventing the USB plug 104A to be plugged-out of the USB port 102A. In such examples, the unique shaped driver may only unfasten the fastener 120 from the bore 130A, thereby preventing the unauthorized removal and/or theft of the USB plug 104A from the access point 100A, by usage of any conventional driver.

In some other examples, the elastic arm 116 may also be moved to the relaxed state (or unlocked stage), based on the downward movement of the bracket 114 caused by the seesaw motion of the rocker switch 118 along the second direction 50 opposite to the first direction 40. In such examples, the seesaw motion of the rocker switch 118 along the second direction 50 may be caused by the application of the depression force on the horizontal section 200 of the rocker switch 118. In some other examples, the seesaw motion of the rocker switch 118 along the second direction 50 may be caused by the downward force exerted on the bracket 114 by the elastic arm 116 and/or by the pair of oppositely inclined tabs 178A, 178B of bottom section 178 in the shell portion 164, when the pair of counter lock features 226 in the connector 138 is aligned with the plurality of retainers 150.

FIG. 6 is a flow diagram depicting a method 600 of locking an electronic plug within an electronic port of an electronic device. It should be noted herein that the method 600 is described in conjunction with FIGS. 1-5.

The method 600 starts at block 602 and continues to block 604. At block 604, the method 600 includes inserting a connector of an electronic plug into a receptacle of an electronic port to releasably connect the connector to the receptacle. In some examples, the electronic plug is pushed inside a cut-out in an enclosure of the electronic device in order to establish connection with the electronic port. The method 600 moves to block 606.

At block 606, the method 600 includes pushing a pair of lock features of a locking assembly in the electronic port, by the connector to cause an elastic arm of the locking assembly to deform and pull the pair of lock features out of the receptacle so as to allow a movement of the connector into the receptacle. In some examples, the pair of lock features is a pair of prongs. In one or more examples, the pair of oppositely inclined tabs of the shell may flatten up by deforming (or bending) marginally outwards to allow the bracket to move upwards, when the plurality of lock features pulls out of the receptacle. A further movement of the electronic plug into the electronic port may cause the connector to i) contact a plurality of retainers in the receptacle and ii) move the plurality of retainer upwards so as to allow the electronic plug to be completely inserted into the electronic port. The method 600 continues to block 608.

At block 608, the method 600 includes aligning a pair of counter lock features, for example, a pair of recesses in the connector of the electronic plug with the plurality of retainers in the receptacle of the electronic port so as to engage each retainer with a corresponding counter lock feature for releasably holding the connector to the receptacle. In such examples, the elastic arm may also move to relaxed state from the biased state, causing the elastic arm to push the pair of lock features to protrude into the receptacle, and engage with the pair of counter lock features. In one or more examples, the pair of oppositely inclined tabs of the shell may also relax by moving marginally inwards to allow the bracket to move downwards, when the plurality of lock features protrudes into the receptacle and engage with the pair of counter lock features. Thus, preventing the movement of the connector out of the receptacle. The method 600 ends at to block 610.

In some examples, when the elastic arm is in the relaxed state, the method 600 may additionally include the step of fastening a fastener of the electronic port disposed in a counter bore of a rocker switch to engage with a bore in the enclosure. Thus, the fastener may restrict the elastic arm to move to the biased state from the relaxed state. Thus, preventing the pair of lock features to disengage from the pair of counter lock features, and plugging out (removing) of the electronic plug from the electronic port.

In some other examples, the method 600 may include applying a depression force on the rocker switch to deform the elastic arm based on an upward movement of the bracket caused by a seesaw motion of the rocker switch along a first direction by the depression force. In such examples, the pair of lock features may get disengaged from the pair of counter lock features, and pull the pair of lock features out of the receptacle so as to allow the movement of the connector into the receptacle. In one or more examples, the pair of oppositely inclined tabs of the shell may flatten up by deforming (or bending) marginally outwards to allow the bracket to move upwards, when the plurality of lock features pulls out of the receptacle.

Similarly, the method 600 may include applying the depression force on the rocker switch to relax the elastic arm based on a downward movement of the bracket caused by the seesaw motion of the rocker switch along a second direction by the depression force. In such examples, the pair of lock features may protrude into the receptacle and get engaged with the pair of counter lock features so as to prevent the movement of the connector out of the receptacle. In one or more examples, the pair of oppositely inclined tabs of the shell may also relax by moving marginally inwards to allow the bracket to move downwards, when the plurality of lock features protrudes into the receptacle and engage with the pair of counter lock features. The method 600 ends at block 610.

Various features as illustrated in the examples described herein may be implemented in a system, such as an electronic device having an electronic port. In particular, the electronic port may have a locking assembly (or a security assembly) to prevent unauthorized removal of the electronic plug when plugged into the electronic device. The locking assembly may include locking elements that are internal to the electronic port, occupying substantially little space due to its integration with one or more existing components of the electronic ports. Further the locking elements may have a complementary design to that of the existing components of the electronic port. Thus, the locking assembly may have a simple design and low cost. Further, the locking assembly disclosed herein is self-contained and does not use additional elements external to the electronic plug for locking or unlocking purpose of the electronic plug.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. An electronic port comprising:
   a receptacle releasably connectable to a connector of an electronic plug; and
   a locking assembly comprising:
      a rocker switch pivotably connected to an enclosure;
      a bracket extending from the rocker switch, disposed around a first end portion of the receptacle; and
      an elastic arm comprising a locking tab engaged with the bracket, and a seating tab seated on a second end portion of the receptacle,
   wherein, in a relaxed state of the elastic arm, a pair of lock features of the locking tab protrudes into the receptacle, and
   wherein the elastic arm is deformable from the relaxed state to a biased state to pull the pair of lock features out of the receptacle.

2. The electronic port of claim 1, wherein, in the relaxed state of the elastic arm, the pair of lock features is further engaged with a pair of counter lock features of the connector to prevent a movement of the connector out of the receptacle, and wherein, in the biased state of the elastic arm, the pair of lock features is disengaged from the pair of counter lock features to allow the movement of the connector into the receptacle.

3. The electronic port of claim 1, wherein the elastic arm is deformable based on an upward movement of the bracket caused by a seesaw motion of the rocker switch along a first direction, and wherein the elastic arm is relaxable based on a downward movement of the bracket caused by the seesaw motion of the rocker switch along a second direction opposite to the first direction.

4. The electronic port of claim 1, wherein the elastic arm is deformable based on a movement of the connector into the receptacle to allow the movement of the connector into the receptacle, and wherein the elastic arm is relaxable when the electronic plug is detachably coupled to the electronic port, so as to engage the pair of lock features with a pair of counter lock features of the connector to prevent the movement of the connector out of the receptacle.

5. The electronic port of claim 1, wherein the locking assembly further comprises a fastener disposed in a counter bore of the rocker switch, and wherein the fastener is fastened into the enclosure to restrict a seesaw motion of the rocker switch used for moving the elastic arm between the relaxed state and the biased state.

6. The electronic port of claim 5, wherein the fastener is a captive screw having a Torx shaped groove head.

7. The electronic port of claim 1, wherein the bracket comprises a protruded portion and a shell portion disposed around the first end portion of the receptacle, wherein the protruded portion comprises a vertical section extending from the rocker switch and a horizontal section having a first through-hole, and wherein the shell portion has a bottom section and a top section having a second through-hole.

8. The electronic port of claim 7, wherein the locking tab of the elastic arm comprises an inclined section and a pillar section having the pair of lock features, wherein the inclined section protrudes through the first through-hole and the pillar section protrudes through the second through-hole so as to engage the locking tab of the elastic arm with the bracket, and wherein the inclined section is a flexible member that is deformable to pull the pillar section having the pair of lock features out of the receptacle in the biased state of the elastic arm.

9. The electronic port of claim 7, wherein the vertical section of the protruded portion is a flexible member that is bendable in the biased state of the elastic arm, wherein the bottom section of the shell portion is another flexible member formed by a pair of oppositely inclined tabs, and wherein the pair of oppositely inclined tabs is bendable by contacting against a bottom portion of the receptacle, in the biased state of the elastic arm.

10. An electronic device comprising:
    an enclosure having a cut-out;
    an electronic port disposed at least partially within the enclosure, comprising:
       a receptacle; and
       a locking assembly comprising:
          a rocker switch pivotably connected to the enclosure;
          a bracket extending from the rocker switch, disposed around a first end portion of the receptacle; and
          an elastic arm comprising a locking tab engaged with the bracket, and a seating tab seated on a second portion of the receptacle; and
    an electronic plug having a connector releasably connectable to the receptacle, when the electronic plug is detachably coupled to the electronic port through the cut-out,
    wherein, in a relaxed state of the elastic arm, a pair of lock features of the locking tab protrudes into the receptacle so as to engage the pair of lock features with a pair of counter lock features of the connector to prevent a movement of the connector out of the receptacle,
    wherein the elastic arm is deformable from the relaxed state to a biased state to pull the pair of lock features out of the receptacle so as to disengage the pair of lock features from the pair of counter lock features to allow the movement of the connector into the receptacle.

11. The electronic device of claim 10, wherein the elastic arm is deformable based on an upward movement of the bracket caused by a seesaw motion of the rocker switch along a first direction, and wherein the elastic arm is relaxable based on a downward movement of the bracket caused by the seesaw motion of the rocker switch along a second direction opposite to the first direction.

12. The electronic device of claim 10, wherein the elastic arm is deformable based on movement of the connector into the receptacle to allow the movement of the connector into the receptacle, and wherein the elastic arm is relaxable when the electronic plug is detachably coupled to the electronic port, so as to engage the pair of lock features with the pair of counter lock features to prevent the movement of the connector out of the receptacle.

13. The electronic device of claim 10, wherein the locking assembly further comprises a fastener disposed in a counter bore of the rocker switch, and wherein the fastener is fastened into the enclosure to restrict a seesaw motion of the rocker switch used for moving the elastic arm between the relaxed state and the biased state.

14. The electronic device of claim 13, wherein the fastener is a captive screw having a Torx shaped groove head.

15. The electronic device of claim 10, wherein the bracket comprises a protruded portion and a shell portion disposed around the first end portion of the receptacle, wherein the protruded portion comprises a vertical section extending from the rocker switch and a horizontal section having a first through-hole, and wherein the shell portion has a bottom section and a top section having a second through-hole.

16. The electronic device of claim 15, wherein the locking tab of the elastic arm comprises an inclined section and a pillar section having the pair of lock features, wherein the inclined section protrudes through the first through-hole and the pillar section protrudes through the second through-hole so as to engage the locking tab of the elastic arm with the bracket, and wherein the inclined section is a flexible member that is deformable to pull the pillar section having the pair of lock features out of the receptacle in the biased state of the elastic arm.

17. The electronic device of claim 15, wherein the vertical section of the protruded portion is a flexible member that is bendable in the biased state of the elastic arm, wherein the bottom section of the shell portion is another flexible member formed by a pair of oppositely inclined tabs, and wherein the pair of oppositely inclined tabs is bendable by contacting against a bottom portion of the receptacle, in the biased state of the elastic arm.

18. The electronic device of claim 10, wherein the electronic port is a universal serial bus (USB) port, wherein the electronic plug is a USB plug.

19. A method comprising:
inserting a connector of an electronic plug into a receptacle of an electronic port to releasably connect the connector to the receptacle;
wherein the connector has a plurality of counter lock features, and wherein the electronic port comprises a locking assembly comprising:
a rocker switch pivotably connected to an enclosure;
a bracket extending from the rocker switch, disposed around a first end portion of the receptacle; and
an elastic arm comprising a locking tab engaged with the bracket, and a seating tab seated on a second end portion of the receptacle, wherein, in a relaxed state of the elastic arm, a pair of lock features of the locking tab protrudes into the receptacle;
pushing the pair of lock features by the connector to cause the elastic arm to deform and pull the pair of lock features out of the receptacle so as to allow a movement of the connector into the receptacle; and
aligning a pair of counter lock features in the connector with a plurality of retainers of the receptacle to cause the elastic arm to relax and push the pair of lock features of the locking tab to protrude into the receptacle, and engage with the pair of counter lock features so as to prevent the movement of the connector out of the receptacle.

20. The method of claim 19, further comprising applying force on the rocker switch to deform the elastic arm based on an upward movement of the bracket caused by a seesaw motion of the rocker switch by the force, to allow the pair of lock features to disengage from the pair of counter lock features and protrude out of the receptacle so as to allow the movement of the connector in and/or out of the receptacle.

\* \* \* \* \*